United States Patent
Levy

(10) Patent No.: US 7,248,715 B2
(45) Date of Patent: Jul. 24, 2007

(54) DIGITALLY WATERMARKING PHYSICAL MEDIA

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 618 days.

(21) Appl. No.: 09/960,228

(22) Filed: Sep. 20, 2001

(65) Prior Publication Data

US 2002/0146148 A1 Oct. 10, 2002

Related U.S. Application Data

(63) Continuation-in-part of application No. 09/940,873, filed on Aug. 27, 2001.

(60) Provisional application No. 60/282,205, filed on Apr. 6, 2001.

(51) Int. Cl.
*G06K 9/00* (2006.01)
(52) U.S. Cl. .................................................. 382/100
(58) Field of Classification Search ................ 382/100, 382/141, 145, 181, 182, 204, 232; 380/54, 380/201; 283/17, 73, 113, 23; 359/1, 619; 369/53.21, 53.31, 59.11, 59.12, 47.19; 341/53; 713/176, 189, 169
See application file for complete search history.

(56) References Cited

U.S. PATENT DOCUMENTS

| | | | |
|---|---|---|---|
| 3,919,479 A | 11/1975 | Moon et al. | |
| 4,230,990 A | 10/1980 | Lert, Jr. et al. | |
| 4,677,466 A | 6/1987 | Lert et al. | |
| 4,739,398 A | 4/1988 | Thomas | |
| 4,807,031 A | 2/1989 | Broughton et al. | |
| 4,972,471 A | 11/1990 | Gross | |
| 5,436,653 A | 7/1995 | Ellis | |
| 5,486,686 A | 1/1996 | Zdybel Jr. et al. | |
| 5,495,581 A | 2/1996 | Tsai | |
| 5,572,653 A | 11/1996 | DeTemple et al. | |
| 5,574,519 A | 11/1996 | Manico et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,584,070 A | 12/1996 | Harris et al. | |
| 5,607,188 A * | 3/1997 | Bahns et al. ............. 283/113 |
| 5,608,718 A * | 3/1997 | Schiewe ................. 369/275.4 |

(Continued)

FOREIGN PATENT DOCUMENTS

EP    493091    7/1992

(Continued)

OTHER PUBLICATIONS

S. Harris, "Monsters Of Inferior Sound," Hi-Fi News, Jul. 2000, 3 pages.

(Continued)

*Primary Examiner*—Duy M. Dang

(57) ABSTRACT

A digital watermark is embedded through varying pit locations on a data side of a CD, SACD or DVD. In one embodiment, a pattern of pits or data indentations forms a visual design on the data side. A watermark is embedded by slightly varying various pit locations within the visual design. In another embodiment, the varied pit locations are imperceptible or nearly imperceptible to human observation. The digital watermark is used as a counterfeit deterrent and as an identifier. Once extracted, the identifier is used to link to related content via the internet.

29 Claims, 3 Drawing Sheets

U.S. PATENT DOCUMENTS

| | | | |
|---|---|---|---|
| 5,640,193 A | 6/1997 | Wellner | |
| 5,737,025 A | 4/1998 | Dougherty et al. | |
| 5,740,244 A | 4/1998 | Indeck | |
| 5,751,854 A | 5/1998 | Saitoh et al. | |
| 5,765,176 A | 6/1998 | Bloomberg | |
| 5,774,452 A | 6/1998 | Wolosewicz | |
| 5,781,914 A | 7/1998 | Stork et al. | |
| 5,841,978 A | 11/1998 | Rhoads | |
| 5,842,162 A | 11/1998 | Fineberg | |
| 5,918,223 A | 6/1999 | Blum et al. | |
| 5,932,863 A | 8/1999 | Rathus | |
| 5,938,727 A | 8/1999 | Ikeda | |
| 5,967,676 A | 10/1999 | Cutler et al. | |
| 5,978,773 A | 11/1999 | Hudetz | |
| 5,982,956 A | 11/1999 | Lahmi | |
| 5,986,651 A | 11/1999 | Reber et al. | |
| 5,991,500 A | 11/1999 | Kanota et al. | |
| 6,081,827 A | 6/2000 | Reber et al. | |
| 6,088,455 A | 7/2000 | Logan et al. | |
| 6,121,530 A | 9/2000 | Sonoda | |
| 6,181,817 B1 | 1/2001 | Zabih | |
| 6,185,316 B1 | 2/2001 | Buffam | |
| 6,255,975 B1 | 7/2001 | Swanson | 341/143 |
| 6,282,362 B1 | 8/2001 | Murphy et al. | |
| 6,286,036 B1 | 9/2001 | Rhoads | |
| 6,304,523 B1 | 10/2001 | Jones et al. | |
| 6,363,043 B1* | 3/2002 | Kondo | 369/53.21 |
| 6,423,478 B1 | 7/2002 | Ha et al. | |
| 6,433,946 B2 | 8/2002 | Ogino | |
| 6,466,670 B1 | 10/2002 | Tsuria et al. | |
| 6,469,969 B2* | 10/2002 | Carson et al. | 369/59.12 |
| 6,549,495 B1 | 4/2003 | Spruit et al. | 369/47.19 |
| 6,674,993 B1 | 1/2004 | Tarbouriech | |
| 6,681,028 B2 | 1/2004 | Rodriguez et al. | |
| 6,738,904 B2* | 5/2004 | Linnartz et al. | 713/189 |
| 6,748,360 B2 | 6/2004 | Pitman | |
| 6,748,533 B1 | 6/2004 | Wu | |
| 6,754,158 B1* | 6/2004 | Kobayashi et al. | 369/59.11 |
| 6,768,709 B2 | 7/2004 | Carson et al. | |
| 6,771,885 B1 | 8/2004 | Agnihotri | |
| 6,772,124 B2 | 8/2004 | Hoffberg et al. | |
| 6,775,217 B1 | 8/2004 | Kato et al. | |
| 6,801,490 B1* | 10/2004 | Sako et al. | 369/53.31 |
| 6,850,252 B1 | 2/2005 | Hofberg | |
| 6,856,977 B1 | 2/2005 | Adelsbach | |
| 6,862,033 B2 | 3/2005 | McClellan | |
| 6,931,451 B1 | 8/2005 | Logan | |
| 6,941,275 B1 | 9/2005 | Swierczek | |
| 6,968,337 B2 | 11/2005 | Wold | |
| 6,973,669 B2 | 12/2005 | Daniels | |
| 6,987,862 B2 | 1/2006 | Rhoads | |
| 6,990,453 B2 | 1/2006 | Wang | |
| 7,047,413 B2 | 5/2006 | Yacobi et al. | |
| 7,050,603 B2 | 5/2006 | Rhoads et al. | |
| 7,054,245 B2 | 5/2006 | Spruit et al. | 369/47.19 |
| 7,058,697 B2 | 6/2006 | Rhoads | |
| 7,127,744 B2 | 10/2006 | Levy | |
| 2001/0007130 A1 | 7/2001 | Takaragi | |
| 2001/0021144 A1 | 9/2001 | Oshima | |
| 2001/0054144 A1* | 12/2001 | Epstein et al. | 713/161 |
| 2001/0055258 A1 | 12/2001 | Carson | |
| 2002/0023020 A1 | 2/2002 | Kenyon et al. | |
| 2002/0026362 A1 | 2/2002 | Tanaka | |
| 2002/0032864 A1 | 3/2002 | Rhoads | |
| 2002/0037083 A1 | 3/2002 | Weare et al. | |
| 2002/0044659 A1 | 4/2002 | Ohta | |
| 2002/0048224 A1 | 4/2002 | Dygert | |
| 2002/0059208 A1 | 5/2002 | Abe | |
| 2002/0068987 A1 | 6/2002 | Hars | |
| 2002/0069107 A1 | 6/2002 | Werner | |
| 2002/0069218 A1 | 6/2002 | Sull et al. | 715/501.1 |
| 2002/0081413 A1* | 6/2002 | DallaVerde | 428/64.2 |
| 2002/0082731 A1 | 6/2002 | Pitman et al. | |
| 2002/0087885 A1 | 7/2002 | Peled | |
| 2002/0088336 A1 | 7/2002 | Stahl | |
| 2002/0099555 A1 | 7/2002 | Pitman et al. | |
| 2002/0118565 A1 | 8/2002 | Matsuo | |
| 2002/0118864 A1 | 8/2002 | Kondo et al. | |
| 2002/0133499 A1 | 9/2002 | Ward et al. | |
| 2002/0138744 A1 | 9/2002 | Schleicher et al. | |
| 2002/0146147 A1 | 10/2002 | Levy | |
| 2002/0146148 A1 | 10/2002 | Levy | 382/100 |
| 2002/0153661 A1 | 10/2002 | Brooks et al. | |
| 2002/0161741 A1 | 10/2002 | Wang et al. | |
| 2002/0168082 A1 | 11/2002 | Razdan | |
| 2002/0174431 A1 | 11/2002 | Bowman et al. | |
| 2002/0184505 A1 | 12/2002 | Mihcak et al. | |
| 2003/0018709 A1 | 1/2003 | Schrempp et al. | |
| 2003/0028796 A1 | 2/2003 | Roberts et al. | |
| 2003/0037010 A1 | 2/2003 | Schmelzer | |
| 2003/0051252 A1 | 3/2003 | Miyaoku | |
| 2003/0061500 A1 | 3/2003 | Mimura et al. | |
| 2003/0101162 A1 | 5/2003 | Thompson et al. | |
| 2003/0120679 A1 | 6/2003 | Kriechbaum et al. | |
| 2003/0135623 A1 | 7/2003 | Schrempp et al. | |
| 2003/0174861 A1 | 9/2003 | Levy et al. | |
| 2004/0049540 A1 | 3/2004 | Wood | |
| 2004/0052369 A1* | 3/2004 | Stebbings | 380/200 |
| 2004/0169595 A1* | 9/2004 | Kalker et al. | 341/53 |
| 2005/0043018 A1 | 2/2005 | Kawamoto | |
| 2005/0058319 A1 | 3/2005 | Rhoads et al. | |
| 2005/0108242 A1 | 5/2005 | Kalker et al. | |
| 2005/0144455 A1 | 6/2005 | Haitsma | |
| 2005/0229107 A1 | 10/2005 | Hull et al. | |
| 2005/0267817 A1 | 12/2005 | Barton et al. | |

FOREIGN PATENT DOCUMENTS

| | | |
|---|---|---|
| EP | 0967803 | 12/1999 |
| EP | 1173001 | 1/2002 |
| EP | 1199878 | 4/2002 |
| WO | 0172030 | 9/2001 |
| WO | 0175794 | 10/2001 |
| WO | WO02/19589 | 3/2002 |
| WO | 02082271 | 10/2002 |

OTHER PUBLICATIONS

Sony SACD, printout of webpage on Aug. 23, 2001, (http://www.sel.sony.com/SEL/consumer/sacd/static/for-security.html), 1 page.

U.S. Appl. No. 10/233,327, filed Aug. 29, 2002, Office Action dated Nov. 25, 2005, 8 pages and Amendment dated Mar. 3, 2006, 10 pages.

U.S. Appl. No. 10/233,327, filed Aug. 29, 2002, Final Office Action dated May 16, 2006.

Ghias et al, Query by Humming: Musical Information Retrieval In An Audio Database. In ACM Mutimedia, pp. 231-236, Nov. 1995.

Kageyama et al, Melody Retrieval with Humming, Proceedings of Int. Computer Music Conference (ICMC), 1993.

Notice of Abandonment, mailed Nov. 28, 2006, in U.S. Appl. No. 10/233,327.

Muscle Fish press release, Muscle Fish's Audio Search Technology to be Encapsulated into Informix Datablade Module, Jul. 10, 1996.

Wold et al, Content-Based Classification, Search, and Retrieval of Audio, IEEE Multimedia Magazine, Fall, 1996.

Zhao, "A WWW Service to Embed and Prove Digital Copyright Watermarks," Proc. Of the European Conf. On Multimedia, Services and Techniques, pp. 1-15, May 1996.

* cited by examiner

DIGITALLY WATERMARKING PHYSICAL MEDIA

RELATED APPLICATION DATA

This application is a continuation-in-part of U.S. patent application Ser. No. 09/940,873, filed Aug. 27, 2001, now abandoned (published as U.S. Pat. No. 2002-0146147 A1). This application also claims the benefit of U.S. Provisional Application No. 60/282,205, filed Apr. 6, 2001. This application is also related to U.S. patent application Ser. Nos. 09/503,881, filed Feb. 14, 2000 (now U.S. Pat. No. 6,614, 914) and 09/924,402, filed Aug. 7, 2001 (published as U.S. Pat. No. 2002-0146146 A1).

FIELD OF THE INVENTION

The present invention generally relates to digital watermarking and, more particularly, relates to digitally watermarking physical media such as CDs, DVDs, SACDs, mini-CDs, etc.

BACKGROUND AND SUMMARY OF THE INVENTION

It's not as easy to spot a pirate as it used to be. The first time you laid eyes on Captain Hook you knew you were dealing with a pirate. Maybe it was the black flag. Maybe it was his motley crew. Now times have changed. Today pirates wear finely tailored suits. Or they lurk in a manufacturing facility in their garage. Yet a common thread binds today's pirates to their historic comrades—they seek to profit from other people's work and creativity. They remain common thieves.

Pirates (including counterfeiters and bootleggers) annually rob industry in the order of tens of billions. These losses are projected to double in the near future, particularly in today's digital world. Compact discs (CDs), digital versatile discs (DVDs) and other recording media are easy prey. They can be massively reproduced with over-the-counter computer equipment. Similarly, media packaging (e.g., art jackets or labels) is easily counterfeited using sophisticated, yet low-cost printers.

The consumer bares the brunt of counterfeiting and piracy. Many consumers purchase sub-par goods thinking that they are genuine. Consumers who purchase counterfeit DVDs or CDs can end up with low fidelity products or blank tracks.

A solution is needed to effectively combat piracy.

Digital watermarking provides a solution. Digital watermarking technology, a form of steganography, encompasses a great variety of techniques by which plural bits of digital data are hidden in some other object, preferably without leaving human-apparent evidence of alteration.

Digital watermarking may be used to modify media content to embed a machine-readable code into the media content. The media may be modified such that the embedded code is imperceptible or nearly imperceptible to the user, yet may be detected through an automated detection process.

Most commonly, digital watermarking is applied to media signals such as images, audio, and video signals. However, it may also be applied to other types of media, including documents (e.g., through line, word or character shifting, texturing, graphics, or backgrounds, etc.), software, multi-dimensional graphics models, and surfaces of objects.

There are many processes by which media can be processed to encode a digital watermark. Some techniques employ very subtle printing, e.g., of fine lines or dots, which has the effect slightly tinting the media (e.g., a white media can be given a lightish-green cast). To the human observer the tinting appears uniform. Computer analyses of scan data from the media, however, reveals slight localized changes, permitting a multi-bit watermark payload to be discerned. Such printing can be by ink jet, dry offset, wet offset, xerography, etc. Other techniques vary the luminance, color qualities, or gain values in a signal to embed a message signal. The literature is full of well-known digital watermarking techniques.

The encoding of a label (or non-data CD side) can encompass artwork or printing on the label, the label's background, a laminate layer applied to the label, surface texture, etc. If a photograph, graphic or image is present, it too can be encoded.

Digital watermarking systems typically have two primary components: an embedding component that embeds the watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark. Previously mentioned U.S. patent application Ser. No. 09/503,881, filed Feb. 14, 2000 (now U.S. Pat. No. 6,614,914), discloses various encoding and decoding techniques. U.S. Pat. Nos. 5,862,260 and 6,122,403 disclose still others. Artisans know many other watermarking techniques.

One form of digital watermarks is a so-called "fragile" watermark. A fragile watermark is designed to be lost, or to degrade predictably, when the data set into which it is embedded is processed in some manner, such as signal processing, compression scanning/printing, etc. A watermark may be made fragile in numerous ways. One form of fragility relies on low watermark amplitude. That is, the strength of the watermark is only marginally above the minimum needed for detection. If any significant fraction of the signal is lost, as typically occurs in photocopying operations, the watermark becomes unreadable. Another form of fragility relies on the watermark's frequency spectrum. High frequencies are typically attenuated in the various sampling operations associated with digital scanning and printing. Even a high amplitude watermark signal can be significantly impaired, and rendered unreadable, by such photocopying operations. (Fragile watermark technology and various applications of such are even further disclosed, e.g., in assignee's U.S. patent application Ser. Nos. 09/234,780, 09/433,104, 09/498,223, 60/198,138, 09/562,516, 09/567, 405, 09/625,577, 09/645,779, and 60/232,163.).

Commonly assigned U.S. Provisional Patent No. 60/282, 205 discloses methods and systems to protect media such as VHS tapes, CDs, DVDs, etc. Media packaging or labels can be embedded with a digital watermark. The digital watermark is used as an identifier to facilitate asset management. Or the watermark can be used to control or regulate access to the media content. In one embodiment, a user shows the packaging or label side of the CD to a digital camera to link to the internet. In another embodiment, the digital watermark is used to verify authenticity of the CD.

Commonly assigned U.S. patent application Ser. No. 09/924,402 (published as U.S. Pat. No. 2002-0146146 A1) discloses an inspector network, which allows an inspector to efficiently detect counterfeited goods via a digital watermark identifier.

There is room in the art for additional counterfeit-deterring methods and techniques. Consider pirates who counterfeit product packaging (including labels) and then apply them to illegal media copies. In some cases a pirate can successfully counterfeit various types of digitally watermarked packaging.

An object of the present invention is to provide a digital watermark that offers additional anti-counterfeiting protection. In one embodiment, an inventive digital watermark includes visible effects of a digital optical storage media. Digital optical storage media includes CDs, DVDs (audio and video), Super Audio CDs ("SACDs"), laser discs, minidiscs, and all similar technology. Images, video, audio and/or data (e.g., software, text, etc.) can be stored on such media. For simplicity such media is referred to as a CD. In another embodiment, a digital watermark is imperceptibly embedded on a data side of a CD through pit placement.

An advantage of the present invention is that such a digital watermark is inherently difficult to copy by common recording CD devices and illegitimate production masters used in the mass production of counterfeited CDs. In one embodiment, the inventive digital watermark helps content owners find illegal CD counterfeits, either at the distributor, retailer or user location. In another embodiment, the inventive digital watermark allows an authentic watermarked CD to link via a network to additional content via the watermark—a distinct consumer advantage over counterfeited media. This method is cost effective since the process adds little or no production costs to individual CDs, and only minimal cost to the process of creating the original CD master. Once the glass master is created, each replica CD includes the watermark.

The foregoing and other features and advantages of the present invention will be more readily apparent from the following detailed description, which proceeds with reference to the accompanying drawings.

DETAILED DESCRIPTION

The present invention creates an imperceptible digital watermark on a CD surface through "pit" manipulation (or placement). Preferably, the digital watermark is arranged on the signal (or data) side of a CD. A pit is a small indentation (or other structure) in a CD surface that is used to convey data. Pits can be visually discernable. According to a first embodiment of the present invention, an imperceptible digital watermark is embedded in a visually perceptible CD bit pattern—much like watermarking a 2-dimensional image.

Pit alignment (or placement) has been used to create "visible" watermarks as demonstrated by Super Audio CDs ("SACDs"). In a first embodiment, my inventive digital watermark is embedded within a CD's visible watermark or design. To simplify the terminology used herein a SACD-like "visible watermark" will be referred to hereafter as a "visual design" (or "pit-pattern"). As will be appreciated, SACD is a high-density disc format that uses a proprietary audio system developed by Philips and Sony. Like the DVD, SACD has high capacity used to achieve a high-quality, multi-channel surround sound. SACDs can be manufactured to include slight variations in their data encoding (or bit placement) to create a visible design effect on the data (or signal) side of an SACD. This visual design is physically placed onto the surface of SACD discs during the replication process using Pit Signal Processing (PSP) technology.

The SACD format provides additional security measures including SACD's own "invisible" watermark, which is stored separately in the data on the disc to prevent reading by non-compliant devices such as DVD-ROM drives. This invisible watermark is encoded (or stored) separately in a Direct Stream Digital (DSD) bit stream. In other words, the SACD invisible watermark resides in the data, not in the visible design or pit-pattern. The SACD invisible watermark can be analyzed through a 1-demensional collection of data bits, which are analyzed collectively.

Figure 1:
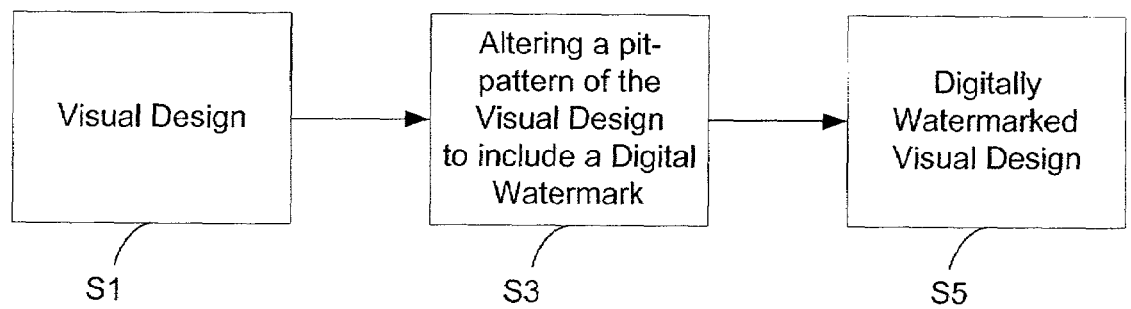
FIG. 1 is a block diagram showing a visual design watermarking method.

In the first embodiment, my inventive digital watermark is embedded in a visual design on a CD. Preferably, my watermark signal (e.g., a pseudo-random noise (PN) sequence) is implemented by slight adjustments to the pit-pattern of the visual design. Since digital watermarks use deviations that are not readily visible to the human eye, but are discernable to watermark detection software, the watermark embedding process preferably does not cause data-read errors in the CD. Preferably, such slight adjustments are imperceptible or nearly imperceptible in comparison to the visual design. As an example embedding process, with reference to FIG. 1, a visual design is created (S1). The pit-pattern of the visual design is varied so as to embed a digital watermark signal therein (S3). A digitally watermarked visual design results (S5). This watermarked visual design can then be transferred to a CD master to enable production of the digitally watermarked CDs. In other embodiments, a digital watermark and visual design are concurrently determined. In still other embodiments, a watermark signal is used as the visual design.

Figure 2:
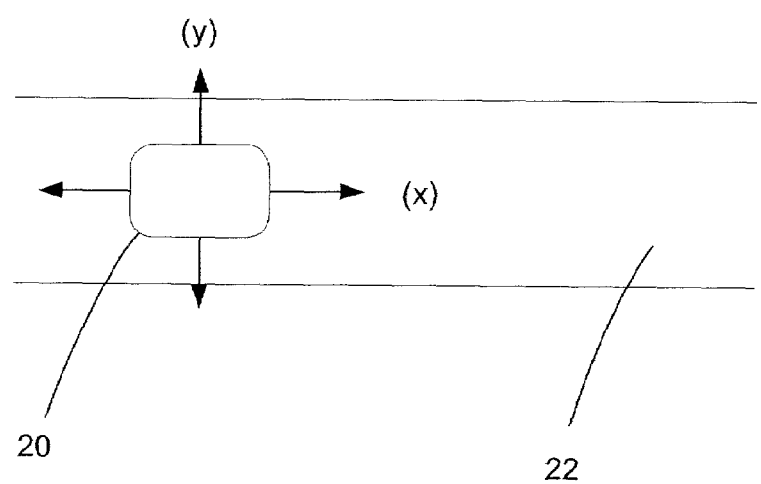
FIG. 2 is a diagram showing pit-deviations in a CD track segment according to one embodiment of the present invention.

Some CD tracking techniques include rings running parallel with the pits. These parallel ring tracks provide more latitude in moving a pit (20) in a track (22) circumference (x direction) as opposed to up and down, e.g., toward the edge or center of a CD (y direction). (See FIG. 2, which show a CD track segment including a pit.). In this case, moving a pit location slightly counter-clockwise could to represent a digital 1. Or moving a pit location slightly clockwise could represent a digital 0, or visa-versa. Of course other techniques can be used to similarly adjust pit-locations to embed a digital watermark, such as offsetting a pit location, elongating (or shortening) a pit indentation, pseudo-randomly deviating pit-locations, etc.

A pirated copy of a digitally watermarked CD will not include the digital watermark since the pirated copy will not readily include the pit-pattern. Common CD recording devices (e.g., CD-Rom burners) copy only 1's and 0's—not the visual design or embedded watermark formed by data pits. It is extremely difficult to counterfeit a glass master so as to include a likelihood of breaking the original's watermark encoding and/or encryption techniques as carried by a pit-pattern. This is particularly true since a watermark protocol, e.g., including a PN sequence, is preferably kept secret by content owners or CD producers. In addition, CD production equipment, capable of creating visual designs, is far more expensive than a standard CD-Rom burner—creating a significant barrier to entry for the common pirate.

Identical pit deviations can be included in every CD copy made on mass-production equipment. In this case, each watermark includes the same identifier. Alternatively, the pit deviations may be changed for each CD to create a unique CD serialization. CD serialization allows each CD to be traced. In one embodiment, a watermark payload per each individual CD includes a common ID (e.g., to identify media title, manufacture, batch run number, date produced, copyright owner, etc.). Similarly, the watermark payload preferably includes a count (or individual CD identifier). The common ID is used for linking, as described below, and the count is used for forensic tracking of each CD.

Figure 3:
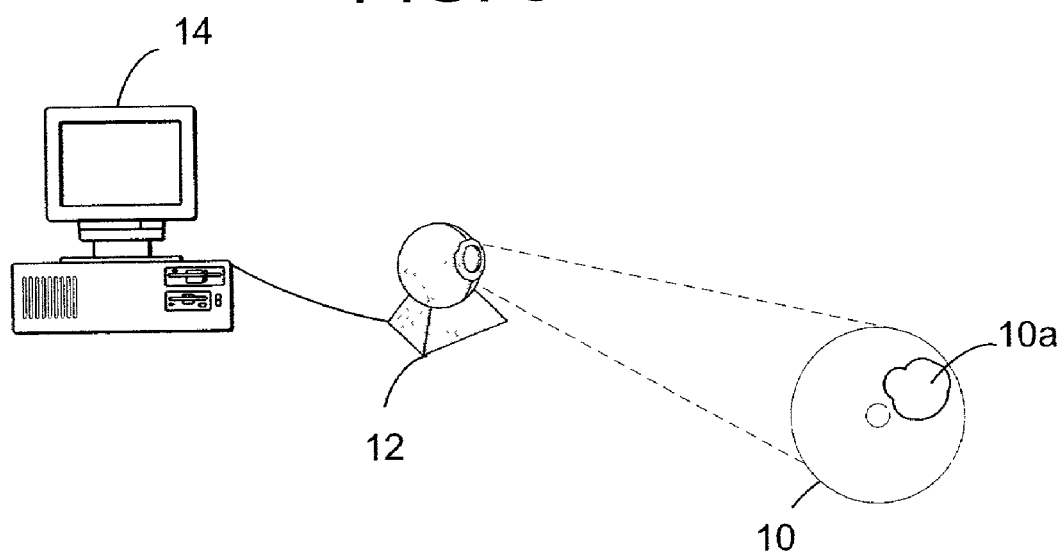
FIG. 3 is a diagram showing the image capture of a CD according to a first embodiment of the present invention.

With reference to FIG. 3, a CD 10 is presented to an input device 12, such as a digital camera, web camera, optical sensor, etc. CD 10 preferably includes a visual design 10a located on a data side of CD 10. Visual design 10a preferably includes a digital watermark embedded therein. (Of course, a non-data CD side may include text, graphics, artworks, images, etc., which may be embedded with a conventional digital watermark. This conventional digital watermark can be compared to the watermark embedded in the visual design, or can be used as a separate or additional identifier or security check.). Input device 12 captures an image of the digitally watermarked visual design 10a. This captured image is communicated to computer 14. Of course, input device 12 can be tethered to computer 14 (as shown) or can otherwise interface with computer 14. Alternatively, input device 12 wirelessly communicates with computer 14, e.g., via Bluetooth or other wireless platform. Computer 14 preferably includes watermark detection and decoding software instructions stored in memory to be executed on computer 14's processor and/or processing circuitry. Computer 14 executes these software instructions to analyze the captured CD image. The embedded watermark is detected from such. In some embodiments, the digital watermark includes a payload or message. Computer 14 preferably extracts the watermark payload from the captured image if present. Computer 14 need not be desktop device as illustrated in FIG. 3. To the contrary computer, 14 can include a handheld device, a laptop, a server system, etc.

My inventive digital watermark need not be embedded in a CD's visual design. Indeed, my inventive digital watermark can be embedded in a CD that does not include a visual design. In a second embodiment, location adjustments (or placements) are made to a set of pits on a data side of a CD. As with the first embodiment, these pit placements can be manipulated in a track circumference direction, or by offsetting a pit location, elongating (or shortening) a pit indentation, pseudo-randomly deviating pit-locations, etc. Alternatively, reflective (or refractive) characteristics of a pit can be altered to convey a digital watermark component. Preferably, the pit location adjustments are imperceptible, or nearly imperceptible, to human observation, yet are detectable through watermark detection analysis.

Figure 4:
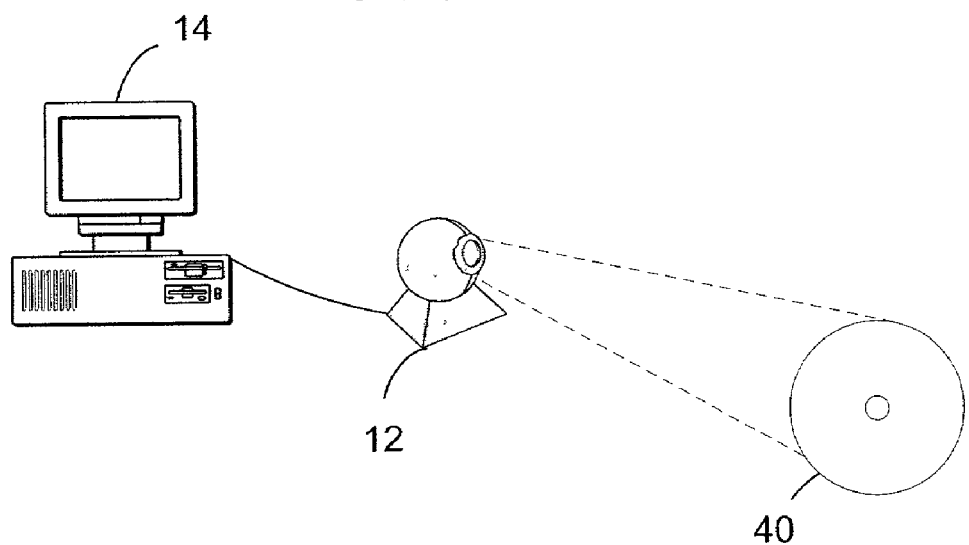
FIG. 4 is a diagram showing the image capture of a CD according to a second embodiment of the present invention.

With reference to FIG. 4, a CD 40 includes a digital watermark embedded through imperceptible (or nearly imperceptible) pit placements on its data side. CD 40 need not include a visual design. CD 40 can be presented to input device 12. Input device 12 captures an image of CD's data side, which includes the embedded digital watermark. This captured image is communicated to computer 14. Computer 14 executes watermark detection and decoding software instructions to analyze the captured CD image. The embedded watermark is detected from such. (Like with the first embodiment, a non-data CD 40 side may optionally include text, graphics, artworks, images, etc., which may be embedded with a conventional digital watermark. This conventional digital watermark can be compared to the watermark embedded through pit placement, or can be used as a separate or additional identifier or security check.).

Figure 5:
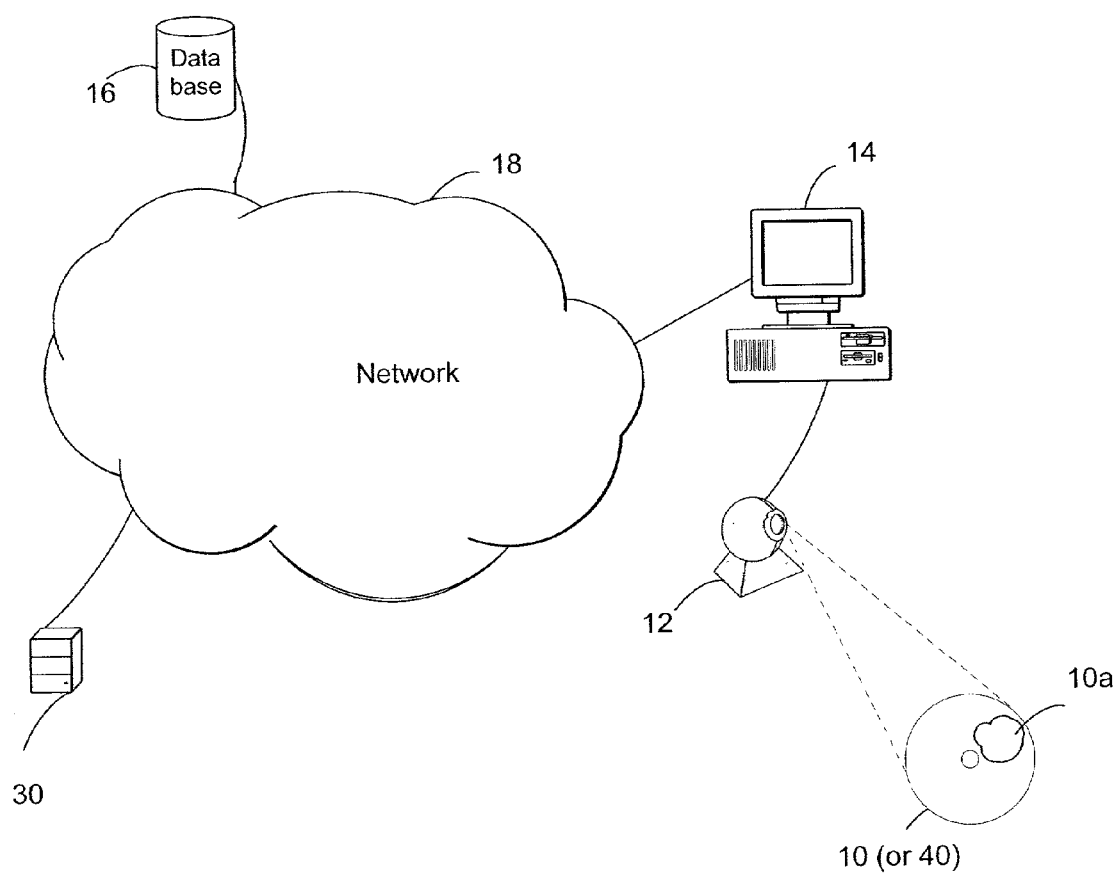
FIG. 5 is a diagram showing a network that is navigable with a CD identifier.

In an alternative embodiment, with reference to FIG. 5, computer 14 communicates the extracted watermarked ID to a database (and router) 16. The watermark ID can be extracted from an image of (or sensor data from) either CD 10 or 40. Database 16 is preferably accessible via a network 18 (e.g., internet, intranet, extranet, wireless network, LAN, WAN, etc.). Alternatively, database 16 is local with respect to computer 14. Database 16 communicates information (e.g., a URL, web address, e-mail address, IP address, etc.) to computer 14 to redirect computer 14 to a web site 30. Assignee's U.S. patent application Ser. No. 09/571,422, filed May 15, 2000, discloses related linking methods and apparatus.

Web site 30 preferably includes accessible content related to CD 10 or 40, such as information about the music, artist, song, movie, actors, content, data, software, content owners, images, etc. contained thereon. Web site 30 also may be a private site, which is only assessable to users via the watermarked CD. Copying or bookmarking the website URL (or link) preferably will not enable user access to the private web site since the link is enabled by a central routing system (e.g., router 16) that receives the watermark ID from a user computer 14. IP address checking and time stamping are some of the ways to help secure a private web site. Assignee's U.S. patent applications Ser. Nos. 09/853,835, filed May 10, 2001 (published as U.S. Pat. No. 2002-0169721 A1), and 09/864,084, filed May 22, 2001 (published as U.S. Pat. No. 2002-0169963 A1), disclose still other techniques for securing a private web site. Such website security techniques may be suitably interchanged with the present invention.

A digital watermark can also be used to verify that CD 10 or 40 is authentic (e.g., is not a pirated copy). The watermark can be verified by inspection agents in retail or distribution channels using the linking techniques described above and/or the techniques described in Assignee's U.S. patent application Ser. No. 09/924,402. If an inspection agent finds a CD without a pit-placement watermark, e.g., when that CD should include a pit-placement watermark, the agent has a clue to help find the source of this pirated CD. In another example, if a CD label provides instructions to hold the CD's data side to a web camera to enable the above-described web linking, and nothing happens, then the CD is probably a pirated copy. The CD label or other packaging can include further instructions in the event of a linking-failure (e.g., upon reading a pirated copy). The instructions can include how to contact the CD or DVD owner or distributor with information that can help trace the origins of the illegal copy.

Similarly, a consumer can verify a CD's (10 or 40) authenticity by testing the linking capabilities of the CD's pit-placement watermark, e.g., prior to purchasing the CD via a web-enabled store kiosk or hand-held device. Or the consumer can verify authenticity at home after the purchase. If consumer finds copied CD/DVDs, they can be provided with instructions and incentives to contact the content owner, helping reduce piracy. Of course, this concept is equally applicable to audio, video and data (e.g., such as software) CDs.

Serialized CDs, discussed above, can be tracked to learn who has purchased and re-purchased the CDs. Or serialization can be used to trace the origin of an illegal copy.

In an alternative embodiment, visible design 10a (FIG. 3) itself is used as an identifier instead of an identifier carried by a digital watermark. Pattern recognition software is used to detect the visual design 10a. The pattern of the visual design 10a is associated with an identifier, which is used as a substitute for the watermark identifier discussed herein. In still another embodiment, the visual design 10a is mathematically analyzed, e.g., via a hash or fingerprinting algorithm. The resulting hash or fingerprint value is used as an identifier. A hash or fingerprint database can be consulted to determine an action or to obtain additional information associated with the identifier. Hence, the visual design or pit-pattern itself can serve as (or be used to derive) an identifier.

There are many advantages of the present invention. In one embodiment, a digital pit-placement watermark is fragile—meaning that it is lost when copied, e.g., copied by a CD burner since CD burners will not reproduce the precious pit variations (or locations). The same digital pit-placement watermark also has some robust features, e.g., it is durable and persistent since it is embedded by physical CD pits. Preferably, a pit-placement watermark creates a 2D imperceptible (or nearly imperceptible) digital watermark that can be captured by a conventional digital camera. A captured image of the pit-placement digital watermark can be analyzed by a watermark detection module (e.g., software or hardware/software combinations). The watermark detection module may optionally carry identifying information that can be used to enhance a CD and to connect a user to related information.

CONCLUDING REMARKS

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, the above-mentioned patents and patent applications are hereby incorporated by reference. The particular combinations of elements and features in the above-detailed embodiments are exemplary only; the interchanging and substitution of these teachings with other teachings in this application and the incorporated-by-reference patents/applications are expressly contemplated.

In an alternative arrangement, CD 40 (FIG. 5) includes a visual design 10a (FIG. 3). A digital watermark, e.g., an imperceptible digital watermark formed through CD pit placement or deviation, is formed in a CD area outside of the visual design 10a. In still another arrangement, such a digital watermark is included in both a visual design 10a and an area outside of the visual design 10a.

The above-described methods and functionality can be facilitated with computer executable software stored on computer readable media. Such software may be stored and executed on a general-purpose computer, or on a server for distributed use. Also, instead of software, a hardware implementation, or a software-hardware implementation can be used.

In view of the wide variety of embodiments to which the principles and features discussed above can be applied, it should be apparent that the detailed embodiments are illustrative only and should not be taken as limiting the scope of the invention. Rather, I claim as my invention all such modifications as may come within the scope and spirit of the following claims and equivalents thereof.

What is claimed is:

1. A method comprising:
altering values representing a visual design to embed a plural-bit digital watermark therein; and
applying the embedded visual design to physical media through changes to a pit-pattern carried by the physical media, wherein the changes to the pit-pattern convey the visual design including the digital watermark embedded therein.

2. The method according to claim 1, wherein the physical media comprises one of at least a SACD, CD, DVD), laser disc, or mini-disc.

3. The method according to claim 1, wherein said applying comprises pit-signal processing.

4. The method according to claim 1, wherein the digital watermark is imperceptible in comparison to the visual design.

5. The method according to claim 1, wherein the visual design comprises a visual watermark.

6. Media including a plurality of pits, said media comprising:
a visual design formed by the plurality of pits; and
a plural-bit digital watermark embedded within the visual design through subtle changes to data representing the visual design.

7. The media according to claim 6, wherein the media comprises one of at least a SACD, CD, DVD), laser disc, or mini-disc.

8. The media according to claim 6, wherein varying pit locations of a subset of the plurality of pits embeds the digital watermark.

9. The media according to claim 6, wherein the visual design comprises a visible watermark.

10. The media according to claim 9, further comprising a watermark embedded within data stored on the media.

11. A method involving media comprising a first machine-readable digital watermark formed by pit placement on a data side of the media, said media further comprising a second machine-readable digital watermark embedded on a non-data side of the media, said method comprising:
receiving first optical scan data corresponding to the data side and second optical scan data corresponding to the non-data side;
decoding the first watermark and second watermark from the respective first and second scan data; and
linking to content related to the media through information carried by the first or second watermark,
wherein said first watermark is compared to the second watermark to authenticate the media.

12. The method according to claim 11 wherein the first and second optical scan data is generated by a digital camera.

13. The method according to claim 12, wherein said digital camera comprises electronic processing circuitry to execute watermark detection software instructions.

14. The method according to claim 11 wherein the pit placement comprises a visual design.

15. A method to identify physical media comprising:
analyzing a visual pattern on the physical media through at least one of hashing and fingerprinting of the visual pattern to derive a plural-bit identifier from the visual pattern itself, wherein the visual pattern is provided with a pit-pattern arranged on or in the surface of the media; and
identifying the physical media through said analyzing.

16. The method according to claim 15 wherein said plural-bit identifier is used in said identifying to identify the physical media.

17. The method according to claim 16, wherein the plural-bit identifier is used to index a database comprising information relaxed to the physical media.

18. The method according to claim 17, wherein the physical media comprises at least one of a SACD, CD, DVD, laser disc, or mini-disc.

19. Optical storage media comprising:
a data side comprising a plurality of pits, wherein physical locations for a set of the pits are arranged to convey a graphic design or visual image, and wherein the graphic design or visual image comprises a plural-bit digital watermark embedded therein through subtle changes to data representing the visual design, wherein the plural-bit digital watermark is detectable from a 2-dimensional image of the data side.

20. The optical storage media according to claim 19, wherein the digital watermark is imperceptible.

21. The optical storage media according to claim 19, wherein the digital watermark is a fragile watermark.

22. The optical storage media according to claim 21, wherein the digital watermark is a robust watermark.

23. The method according to claim 11, further comprising authenticating the media by successfully completing said linking.

24. A method comprising:
receiving optical scan data representing at least a portion of a data side of physical media, wherein the data side of the physical media comprises a machine-readable watermark formed through a pit pattern formed on or in the data side of the physical media
decoding the watermark to obtain a plural-bit message;
linking to a remote resource using at least some information carried by the message,
whereby successfully completing said linking authenticates the physical media.

25. A machine-readable medium comprising executable instructions stored thereon, said instructions comprising instructions carry our the method of claim 24.

26. The method of claim 24 wherein the pit pattern comprises pits and lands.

27. The method of claim 24 wherein the pit pattern comprises subtle changes to at least one of pits and lands.

28. A machine-readable medium comprising executable instructions stored thereon, said instructions comprising instructions carry out the method of claim 15.

29. A machine-readable medium, comprising executable instructions stored thereon, said instructions comprising instructions carry out the method of claim 1.

* * * * *